United States Patent
Liao et al.

(10) Patent No.: US 9,654,374 B2
(45) Date of Patent: May 16, 2017

(54) METHOD AND SYSTEM FOR STREAM TESTING BY USING SWITCHING HUB

(71) Applicant: Celestica Technology Consultancy (Shanghai) Co., Ltd., Shanghai (CN)

(72) Inventors: Yunzhi Liao, Shanghai (CN); Liang Yin, Shanghai (CN)

(73) Assignee: Celestica Technology Consultancy (Shanghai) Co., Ltd., Shanghai (CN)

( * ) Notice: Subject to any disclaimer, the term of this patent is extended or adjusted under 35 U.S.C. 154(b) by 245 days.

(21) Appl. No.: 14/550,141

(22) Filed: Nov. 21, 2014

(65) Prior Publication Data
US 2015/0200836 A1 Jul. 16, 2015

(30) Foreign Application Priority Data
Jan. 15, 2014 (CN) .......................... 2014 1 0018466

(51) Int. Cl.
*H04L 12/46* (2006.01)
*H04L 12/26* (2006.01)
*H04L 12/931* (2013.01)

(52) U.S. Cl.
CPC ............ *H04L 43/50* (2013.01); *H04L 12/467* (2013.01); *H04L 49/208* (2013.01)

(58) Field of Classification Search
CPC .......... H04L 43/50; H04L 49/20; H04L 12/46
See application file for complete search history.

(56) References Cited

U.S. PATENT DOCUMENTS

| | | | | |
|---|---|---|---|---|
| 6,847,620 B1* | 1/2005 | Meier | ................ | H04L 12/4641 370/328 |
| 8,619,599 B1* | 12/2013 | Even | ...................... | H04L 43/50 370/242 |
| 2004/0252722 A1* | 12/2004 | Wybenga | ............ | H04L 12/4645 370/474 |
| 2006/0002305 A1* | 1/2006 | Ginzburg | ................ | H04L 43/50 370/241 |
| 2006/0140128 A1* | 6/2006 | Chi | ..................... | H04L 12/2697 370/241 |
| 2009/0122801 A1* | 5/2009 | Chang | ................. | H04L 12/4645 370/395.53 |
| 2014/0153441 A1* | 6/2014 | Frey | ........................ | H04L 43/50 370/255 |
| 2015/0036493 A1* | 2/2015 | Cj | ...................... | H04L 12/4641 370/235 |
| 2015/0138993 A1* | 5/2015 | Forster | .................... | H04L 41/12 370/248 |

* cited by examiner

*Primary Examiner* — Xavier Szewai Wong
(74) *Attorney, Agent, or Firm* — Nixon Peabody LLP

(57) ABSTRACT

The present invention provides a method for stream testing by a switching hub including the steps of generation a test data stream by the switching hub and testing a plurality of DUTs by using the test data stream. A first port of the switching hub transmits port mirroring to a second port of the switching hub. A packet is transmitted through a physical cable from the first port. The first port and the second port are added to a first virtual local area (VLAN) in a native manner. The second port receives a test packet in a self-loop mode. The test data stream is created by repeatedly transmitting the test packet from the second port. In addition, the present invention further provides a system for stream testing by a switching hub.

9 Claims, 2 Drawing Sheets

METHOD AND SYSTEM FOR STREAM TESTING BY USING SWITCHING HUB

CROSS-REFERENCES TO RELATED APPLICATIONS

This application claims the priority of Chinese patent application No. 201410018466.4, filed on Jan. 15, 2014, which is incorporated herewith by reference.

BACKGROUND OF THE INVENTION

1. Field of the Invention

The present invention relates to testing of a data communication device, and more particularly, to a method and a system for stream testing by using a switching hub.

2. The Prior Arts

With the rapid development of modern communication bandwidth, the systems of corresponding communication products are getting more and more complex, such as high-speed interfaces, bankplane bandwidth, high-density ports, system layout and high reliability. Since complexity of communication products is greatly increased, there are many different types of product failures, such that the failure rate of communication products is increased. Moreover, since communication manufacturing companies want to provide best products for users, new communication devices are required to be tested. As such, product failures can be found in the production phase, but this will increase the testing pressure in the production phase. Therefore, the defective products will not be delivered to users, and companies' reputation may not be impacted. In addition, the maintenance cost may also be reduced. Owing to increased product complexity, users not only require the performance of communication products but also require testing of communication products.

Further, in order to reduce the loss rate of measurement, enhance the qualified rate of products and improve product quality, a large test data stream is usually used to simulate a real test data stream. Accordingly, in the research and manufacturing phases, data communication products must be tested by performing a data stream test before shipments. In other words, all the ports of DUTs must be tested to determine whether the DUTs may correctly transmit and receive packets and whether the DUTs have data loss. As such, the quality of products may be guaranteed. However, the DUTs are usually tested by expensive dedicated communication testing instruments, such that the production cost is greatly increased. That is to say, if a large number of Ethernet switching hubs and routers are manufactured, a large number of testing instruments are required, such that the production cost is greatly increased. Therefore, for the sake of meeting the requirement of reducing the testing cost, it is necessary to provide an alternative tester having throughput testing for testing data communication products.

SUMMARY OF THE INVENTION

In light of the foregoing drawbacks, an objective of the present invention is to provide a method for stream testing by a switching hub, thereby enabling data communication products to be tested by using low-cost testing equipment.

For achieving the foregoing objective, the present invention provides a method for stream testing by a switching hub, including the steps of generating a test data stream by the switching hub, wherein a first port of the switching hub transmits port mirroring to a second port of the switching hub, a packet is transmitted through a physical cable from the first port, the first port and the second port are added to a first virtual local area (VLAN) in a native manner, the second port receives a test packet in a self-loop mode, the test packet is forwarded to the first port from the second port, test packet mirroring is transmitted to the second port while the first port transmits the test packet, and the test data stream is created by repeatedly transmitting the test packet from the first port; and testing a plurality of DUTs by using the test data stream.

Preferably, the step of generating a test data stream by the switching hub includes the steps of connecting the first port and the third port of the switching hub through the physical cable; adding the third port to the second VLAN in the native manner; using other ports as service ports of the switching hub in addition to the first port, the second port and the third port of the switching hub; adding the service ports to a second VLAN in a hybrid manner; and forwarding the test data stream from the service ports.

Preferably, the step of testing a plurality of DUTs by using the test data stream includes the steps of adding the service ports and DUT ports connected to the service ports to a third VLAN in the native manner; forwarding the test data stream received by the DUT ports to the service ports; and acquiring information of the service ports and obtaining a test result of the DUTs connected to the service ports.

Preferably, a test packet received by the second port is defined by a user.

Preferably, the physical cable may be an optical fiber cable or an Ethernet cable.

Preferably, the service ports are connected to the DUT ports through an optical fiber cable or an Ethernet cable.

Preferably, the DUT includes at least one port, and the DUT transmits the received test data to other ports of the DUT and the service ports.

According to the present invention, the present invention further provides a system for stream testing by a switching hub. The system for stream testing by a switching hub includes a single test data stream generation module generating a test data stream by the switching hub. A first port of the switching hub transmits port mirroring to a second port of the switching hub. A packet is transmitted through a physical cable from the first port. The first port and the second port are added to a first VLAN in a native manner. The second port receives a test packet in a self-loop mode. The test packet is forwarded to the first port from the second port. Test packet mirroring is transmitted to the second port while the first port transmits the test packet. The test data stream is created by repeatedly transmitting the test packet from the first port.

Preferably, the system of the present invention further includes a multiple test data stream generation module generating multiple test data streams based on the test data stream. The first port and the third port of the switching hub are connected through the physical cable. The third port is added to the second VLAN in the native manner. Other ports are used as service ports of the switching hub in addition to the first port, the second port and the third port of the switching hub. The service ports are added to a second VLAN in a hybrid manner. The test data stream is forwarded from the service ports.

Preferably, the system of the present invention further includes a test module testing the DUTs connected to the service ports. The service ports and DUT ports connected to the service ports are added to a third VLAN in the native manner. The test data stream received by the DUT ports is forwarded to the service ports. Information of the service ports is acquired and a test result of the DUTs connected to the service ports is obtained.

Preferably, the physical cable may be an optical fiber cable or an Ethernet cable.

As described above, the method and the system for stream testing by a switching hub may bring about the following technical effects. A test data stream may be generated by a switching hub. A switching hub may simulate a number of ports of a tester line card, and may generate a test data packet having a line speed. Results such as a throughput testing performance may be obtained by means of reading information from the number of ports based on statistics. As such, the throughput testing may be performed, and the cost of production may also be reduced dramatically.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
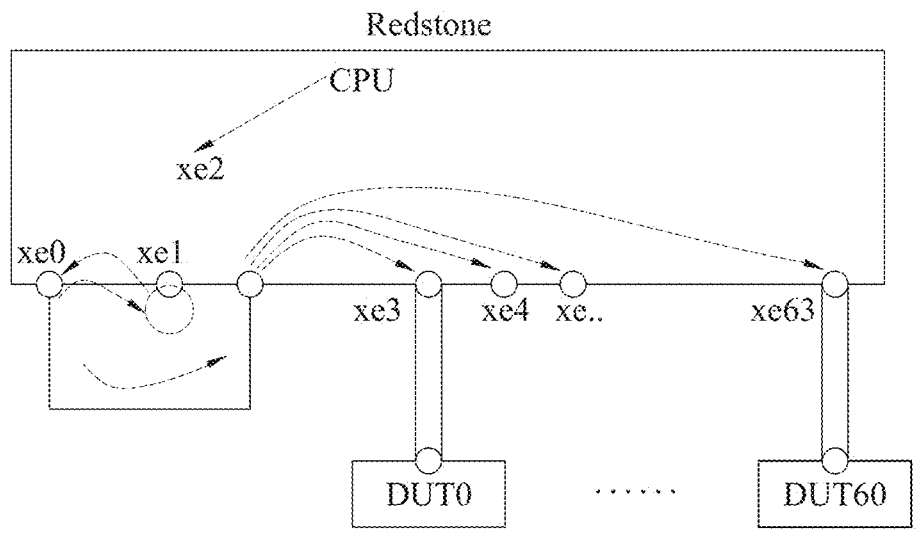
FIG. 1 is a schematic diagram illustrating a method for stream testing by using a switching hub according to the present invention.
Figure 2:
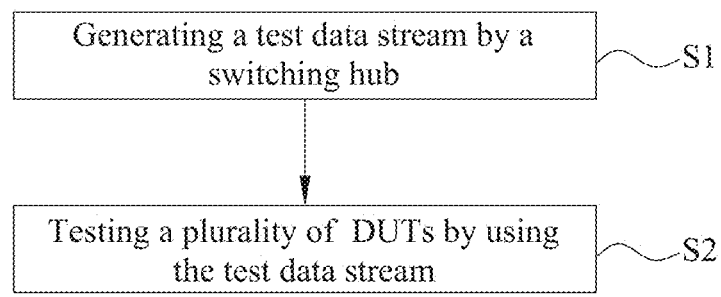
FIG. 2 is a flow chart showing the method for stream testing by using a switching hub according to the present invention.
Figure 3:
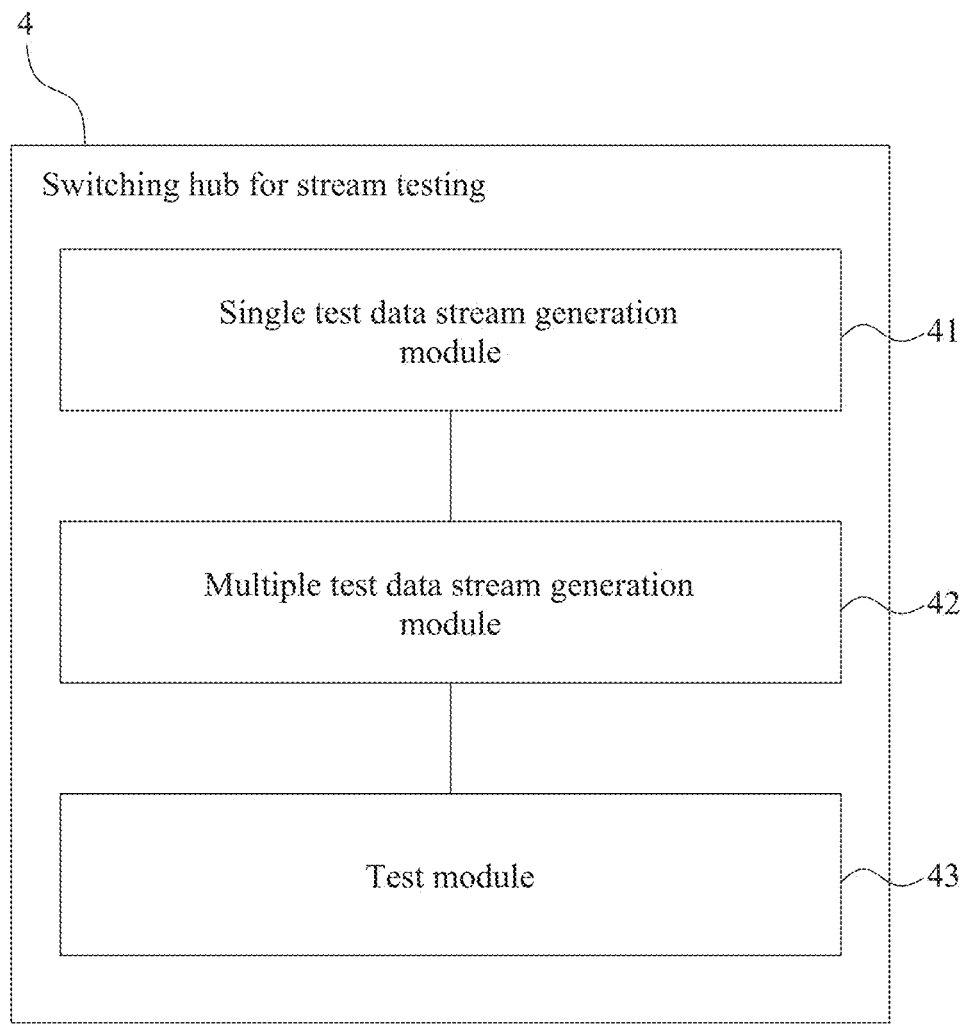
FIG. 3 is a block diagram showing a system for stream testing by using a switching hub according to the present invention.

With regard to FIGS. 1-3, the drawings showing embodiments are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation.

In light of the foregoing drawings, an objective of the present invention is to provide a method for stream testing by a switching hub, as shown in FIG. 2. The method for stream testing of the present invention includes the steps of generating a test data stream by the switching and testing a plurality of DUTs by using the test data stream.

According to the present invention, in step S1, the step of generating a test data stream by the switching is achieved by the following steps. A first port of the switching hub may transmit port mirroring to a second port of the switching hub. A packet may be transmitted through a physical cable from the first port. The first port and the second port are added to a first virtual local area (VLAN) in a native manner. The second port receives a test packet in a self-loop mode. The test packet is forwarded to the first port from the second port. Test packet mirroring is transmitted to the second port while the first port transmits the test packet. The test data stream is created by repeatedly transmitting the test packet from the first port.

In other words, port mirroring may send a copy of packets to a mirroring destination port, and includes inbound port mirroring and outbound port mirroring. Inbound port mirroring sends a copy of received packets to a destination port, but outbound port mirroring sends a cope of packets sent by a mirroring port to a mirroring destination port. Adding the first port and the second port to a first VLAN in a native manner means creating a first VLAN and enabling the first port and the second port to work in a native manner in the first VLAN. When ports works in a native manner in the first VLAN, an untagged packet is forwarded in the first VLAN, and simultaneously the ports receives and forwards the untagged packet in a native manner in the first VLAN. Referring to FIG. 1, the first port xd0 of the switching hub configured as outbound port mirroring may send a packet to the second port. The first port xe0 may be connected to the third port xe2 of the switching hub through a physical cable. The physical cable may be an optical fiber cable or an Ethernet cable. Accordingly, while the first port xe0 sends the packet to the third port xe2 that is physically connected to the first port xe0, a copy of the packet is forwarded to the second port xe1. That is, the copied packet may be sent from the second port xe1 of the switching hub. The first port xe0 and the second port xe1 may be added to the first VLAN in a native manner. Since the second port xe1 and the first port xe0 work in the same VLAN, the packet received by the second port xe1 is forwarded to the first port xe0 in accordance with the VLAN forwarding principle. As such, the packet received by the second port xe1 may be forwarded to the first port xe0. The second port xe1 is configured to work in a self-loop mode, i.e., a lookback mode. That is to say, in the self-loop mode, a packet sent by a port may be returned to the port. On this occasion, when the second port xe1 receive a test packet, the test packet is a packet sent from the internal system of the switching hub to the second port xe1. Since the second port works in the self-loop mode, the second port xe1 receives the test packet, and forwards the test packet to the first port xe0. After the first port xe0 receives the test packet, and forwards the test packet to the third port xe2 which is physically connected to the first port xe1. Since the first port xe0 configured as outbound port mirroring may send a packet to the second port xe1, a copy of the packet sent by the first port may be forwarded to the second port xe1. In a self-loop mode, the packet may be returned to the second port xe1, and the returned packet may also be returned to the first port xe0. Therefore, a test data packet stream may be created by repeatedly transmitting the test packet from the second port xe1 to the third port xe2. The test packet received by the second port xe1 may be defined by a user. For example, a type of the test packet may be defined. In brief, the internal system (CPU) of the switching hub may transmit a packet to a self-loop port; that is, the packet may be transmitted by the self-loop port. Additionally, the packet may be defined by a user. Since the self-loop port works in a self-loop mode, the packet may be received by the self-loop port, and forwarded to the first port through VLAN. When the packet is forwarded from the first port, a copy of the packet may be forwarded to the self-loop port based on outbound port mirroring configuration. Accordingly, the test data stream may be created.

As shown in FIG. 1, the step of generating a test data stream by the switching hub further includes the steps of connecting the first port xe0 and the third port xe2 of the switching hub through the physical cable; adding the third port xe2 to the second VLAN in the native manner; using other ports as service ports of the switching hub in addition to the first port xe0, the second port xe1 and the third port xe2 of the switching hub; adding the service ports to a second VLAN in a hybrid manner; and forwarding the test data stream from the service ports.

According to the present invention, the step of adding the service ports to a second VLAN in a hybrid manner includes the following steps. The service ports work in the second VLAN in a hybrid manner, and may forward the tagged packet in the second VLAN in a hybrid manner. Other ports may be used as service ports in addition to the first port xe0, the second port xe1 and the third port xe2. As shown in FIG. 1, anyone of the ports xe3-xe63 may be used as a service port. Service ports may be added to the second VLAN. Since the third port xe2 and the service ports work in the same VLAN, the third port xe2 may receive the test data stream and forward the test data stream to the service ports that are added to the second VLAN. Service ports may be anyone of or all of the ports xe3-xe63. The ports added to the second VLAN may be service ports. That is to say, all the service ports may receive a stable test data packet stream. DUTs may be tested by the forwarded data packet stream.

In step S2, the step of testing a plurality of DUTs by using the test data stream is achieved by the following steps. The service ports and DUT ports connected to the service ports are added to a third VLAN in the native manner. The test data stream received by the DUT ports is forwarded to the service ports. Information of the service ports is acquired, and a test result of the DUTs connected to the service ports is obtained. For example, the service ports may be the ports xe1-xe63, as shown in FIG. 1. The service ports may be connected to DUTs through an optical fiber cable or an Ethernet cable. The service ports and the DUTs connected to the service ports may be added to the third VLAN in a native manner. In other words, if a number of service ports are tested simultaneously, the services ports are connected to the service ports by an optical fiber cable or an Ethernet cable. Each of service ports works in a unique VLAN. The service ports and the DUTs may be added to the unique VLAN in a native manner. That is to say, each of service ports is correspondingly added to a VLAN in a native manner. For example, as shown in FIG. 3, a port xe3 connected to a DUT may be added to a third VLAN. Also, a port xe4 connected to another DUT may be added to a fourth VLAN. Accordingly, a port xe63 connected to a DUT may be added to a sixty-third VLAN. The test data stream received by the DUTs may be forwarded to the service ports. Since the ports are added to the second VLAN in a hybrid manner, all the service ports may receive the test data stream finally. The third port may be enabled to control the start and the stop of test data stream according to an instruction to the third port. In addition, the start and the stop of testing of the DUTs respectively connected to the service ports may be controlled by the service ports in accordance with instructions to the service ports. When testing is finished, information of the service ports may be obtained. The information may include the number of forwarded packets, the number of the received packets, lost packets, wrong packets, and so on. Test results of the DUTs connected to the service ports may be obtained based on the information.

According to the present invention, in step S2, the DUT includes at least one port. The DUT may forward the received test data to other ports of the DUT, and may finally forward it to the service ports. For example, a DUT such as DUT0 may be a switching hub having N (N>1) ports that is required to be tested. After a DUT port of a DUT switching hub receives a transmitted test data stream, the test data stream may be forwarded to a service port (such as xe3). On this occasion, only one DUT port is tested. Moreover, when one DUT of a DUT switching hub receives a test data stream from a service port, the test data stream may be forwarded to other ports of the DUT switching hub, and may be finally forwarded to the service port (such as xe3). For example, a DUT switching hub has three ports (port A, port B and port C) that are required to be tested. After port A receives the test data stream, the test data stream is forwarded to port B. After port B receives the test data stream, the test data stream is also forwarded to port C. Subsequently, port C may forward the received test data stream to the service port.

Referring to FIG. 3, the present invention further provides a system for stream testing by a switching hub. The system of the present invention includes a single test data stream generation module 41, a multiple test data stream generation module 42 and a test module 43.

According to the present invention, the single test data stream generation module 41 may generate a test data stream by the switching hub. A first port of the switching hub may transmit port mirroring to a second port of the switching hub. A packet may be transmitted through a physical cable from the first port. The first port and the second port may be added to a first virtual local area network (VLAN) in a native manner. The second port may receive a test packet in a self-loop mode. The test packet may be forwarded to the first port from the second port. Test packet mirroring may be transmitted to the second port while the first port transmits the test packet. As such, the test data stream may created by repeatedly transmitting the test packet from the first port.

Moreover, the multiple test data stream generation module 42 may generate multiple test data streams based on the test data stream. The first port and the third port of the switching hub may be connected through the physical cable. The third port may be added to the second VLAN in the native manner. Other ports may be used as service ports of the switching hub in addition to the first port, the second port and the third port of the switching hub. The service ports may be added to a second VLAN in a hybrid manner, and the test data stream may be forwarded from the service ports.

According to the present invention, the test module 43 may test the DUTs connected to the service ports. The service ports and DUT ports connected to the service ports may be added to a third VLAN in the native manner. The test data stream received by the DUT ports may be forwarded to the service ports. As such, information of the service ports may be acquired and a test result of the DUTs connected to the service ports may be obtained.

From the above, the method for stream testing by a switching hub of the present invention may bring about the following technical effects. A test data stream may be generated by a switching hub. A switching hub may simulate a number of ports of a tester line card, and may generate a test data packet having a line speed. Result such as a throughput testing performance may be obtained by means of reading information from the number of ports based on statistics. As such, the throughput testing may be performed, and the cost of production may also be reduced dramatically. Therefore, it is clear that the present invention may effectively overcome the aforementioned prior-art issues, and has industrial applicability.

The above exemplary embodiment describes the principle and effect of the present invention, but is not limited to the present invention. It will be apparent to those skilled in the art that various modifications and variations can be made to the disclosed embodiments. It is intended that the specification and examples be considered as exemplary only, with a true scope of the disclosure being indicated by the following claims and their equivalents.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for stream testing by a switching hub, comprising the steps of:
   generating a test data stream by the switching hub, wherein a first port of the switching hub transmits port mirroring to a second port of the switching hub, a packet is transmitted through a physical cable from the first port, the first port and the second port are added to a first virtual local area network (VLAN) in a native manner, the second port receives a test packet in a self-loop mode, the test packet is forwarded to the first port from the second port, test packet mirroring is transmitted to the second port while the first port transmits the test packet, and the test data stream is created by repeatedly transmitting the test packet from the first port; and
   testing a plurality of device under tests (DUTs) by using the test data stream;
   wherein the step of generating a test data stream by the switching hub comprises the steps of:
   connecting the first port and the third port of the switching hub through the physical cable;
   adding the third port to the second VLAN in the native manner;
   using other ports as service ports of the switching hub in addition to the first port, the second port and the third port of the switching hub;
   adding the service ports to a second VLAN in a hybrid manner; and
   forwarding the test data stream from the service ports;
   wherein the native manner indicates that the packet forwarded in the first VLAN is untagged;
   wherein the hybrid manner indicates that the packet forwarded by the service ports in the second VLAN is tagged.

2. The method according to claim 1, wherein the step of testing a plurality of DUTs by using the test data stream comprises the steps of:
   adding the service ports and DUT ports connected to the service ports to a third VLAN in the native manner;
   forwarding the test data stream received by the DUT ports to the service ports; and
   acquiring information of the service ports and obtaining a test result of the DUTs connected to the service ports.

3. The method according to claim 1, wherein a test packet received by the second port are defined by a user.

4. The method according to claim 1, wherein the physical cable is an optical fiber cable or an Ethernet cable.

5. The method according to claim 2, wherein the service ports are connected to the DUT ports through an optical fiber cable or an Ethernet cable.

6. The method according to claim 2, wherein the DUT comprises at least one port, and the DUT transmits the received test data to other ports of the DUT and the service ports.

7. A system for stream testing by a switching hub, comprising:
   a single test data stream generation processor generating a test data stream by the switching hub, wherein a first port of the switching hub transmits port mirroring to a second port of the switching hub, a packet is transmitted through a physical cable from the first port, the first port and the second port are added to a first virtual local area network (VLAN) in a native manner, the second port receives a test packet in a self-loop mode, the test packet is forwarded to the first port from the second port; test packet mirroring is transmitted to the second port while the first port transmits the test packet, and the test data stream is created by repeatedly transmitting the test packet from the first port; and
   a multiple test data stream generation processor generating multiple test data streams based on the test data stream, wherein the first port and the third port of the switching hub are connected through the physical cable, the third port is added to the second VLAN in the native manner, other ports are used as service ports of the switching hub in addition to the first port, the second port and the third port of the switching hub, the service ports are added to a second VLAN in a hybrid manner, and the test data stream is forwarded from the service ports,
   wherein the native manner indicates that the packet forwarded in the first VLAN is untagged,
   wherein the hybrid manner indicates that the packet forwarded by the service ports in the second VLAN is tagged.

8. The system according to claim 7, further comprising a test processor testing the device under tests (DUTs) connected to the service ports, wherein the service ports and DUT ports connected to the service ports are added to a third VLAN in the native manner, the test data stream received by the DUT ports is forwarded to the service ports, and information of the service ports is acquired and a test result of the DUTs connected to the service ports is obtained.

9. The system according to claim 7, wherein the physical cable is an optical fiber cable or an Ethernet cable.

* * * * *